US006942184B1

(12) United States Patent
Morris

(10) Patent No.: US 6,942,184 B1
(45) Date of Patent: Sep. 13, 2005

(54) AIR DROP DEVICE

(75) Inventor: David C. Morris, 455 W. 23rd St., #14F, New York, NY (US) 10011

(73) Assignee: David C. Morris, New York, NY (US)

( * ) Notice: Subject to any disclaimer, the term of this patent is extended or adjusted under 35 U.S.C. 154(b) by 0 days.

(21) Appl. No.: 10/462,069

(22) Filed: Jun. 13, 2003

Related U.S. Application Data

(60) Provisional application No. 60/388,706, filed on Jun. 13, 2002.

(51) Int. Cl.$^7$ .............................................. B64D 17/02
(52) U.S. Cl. ................................................. 244/138 R
(58) Field of Search ........................... 244/138 R, 139, 244/138 A, 142, 152, 145; 446/34, 37

(56) References Cited

U.S. PATENT DOCUMENTS

| | | | | |
|---|---|---|---|---|
| 910,488 A | * | 1/1909 | Bernard | 244/6 |
| 1,003,782 A | * | 9/1911 | Ostermai | 244/23 R |
| 1,011,761 A | * | 12/1911 | Dillon | 244/17.15 |
| 1,379,264 A | * | 5/1921 | Julian | 244/139 |
| 1,464,339 A | * | 8/1923 | Radon | 244/113 |
| 3,003,721 A | * | 10/1961 | Toomey | 244/142 |
| 3,333,643 A | * | 8/1967 | Girard | 416/44 |
| 5,174,527 A | * | 12/1992 | Kasher | 244/145 |
| 5,678,788 A | * | 10/1997 | Hetzer et al. | 244/152 |
| 5,899,415 A | * | 5/1999 | Conway et al. | 244/152 |
| 6,164,594 A | * | 12/2000 | Pignol et al. | 244/138 A |

FOREIGN PATENT DOCUMENTS

| | | | | |
|---|---|---|---|---|
| DE | 379812 | * | 8/1923 | 244/138 R |

* cited by examiner

*Primary Examiner*—Tien Dinh
(74) *Attorney, Agent, or Firm*—Law Office of Timothy E. Siegel; Timothy E. Siegel

(57) ABSTRACT

An air drop device that includes a frame defining a through-hole and that supports a substantially vertical axle, substantially central to the through-hole. A blade assembly is rotatably mounted to the substantially vertical axle. Also, at least three tethers are connected to the frame and are adapted to be connected to the load. In addition, a set of tether length adjust devices, each located on a different one of said tethers, are capable to take-up some of the tether to reduce the length of said tether.

4 Claims, 5 Drawing Sheets

AIR DROP DEVICE

RELATED APPLICATIONS

This application claims priority from U.S. provisional patent application Ser. No. 60/388,706, filed on Jun. 13, 2002.

BACKGROUND OF THE INVENTION

The current and predominant means of delivering small unit bundles—parachute and/or impact resistant packing—for either logistics or humanitarian relief, provide no way to direct the bundles to a target in a controlled manner to insure safe delivery. In areas of strong, high altitude wind and wind shear, such as in the mountains of Afghanistan, parachutes cannot be positioned either reliably or accurately: drops can drift into the wrong hands.

SUMMARY OF THE INVENTION

The present invention is an air drop device that includes a frame defining a through-hole and that supports a substantially vertical axle, substantially central to the through-hole. A blade assembly is rotatably mounted to the substantially vertical axle. Also, at least three tethers are connected to the frame and are adapted to be connected to the load. In addition, a set of tether length adjust devices, each located on a different one of said tethers, are capable to take-up some of the tether to reduce the length of said tether.

The foregoing and other objectives, features and advantages of the invention will be more readily understood upon consideration of the following detailed description of the preferred embodiment(s), taken in conjunction with the accompanying drawings.

DETAILED DESCRIPTION OF THE PREFERRED EMBODIMENT(S)

Figure 1:
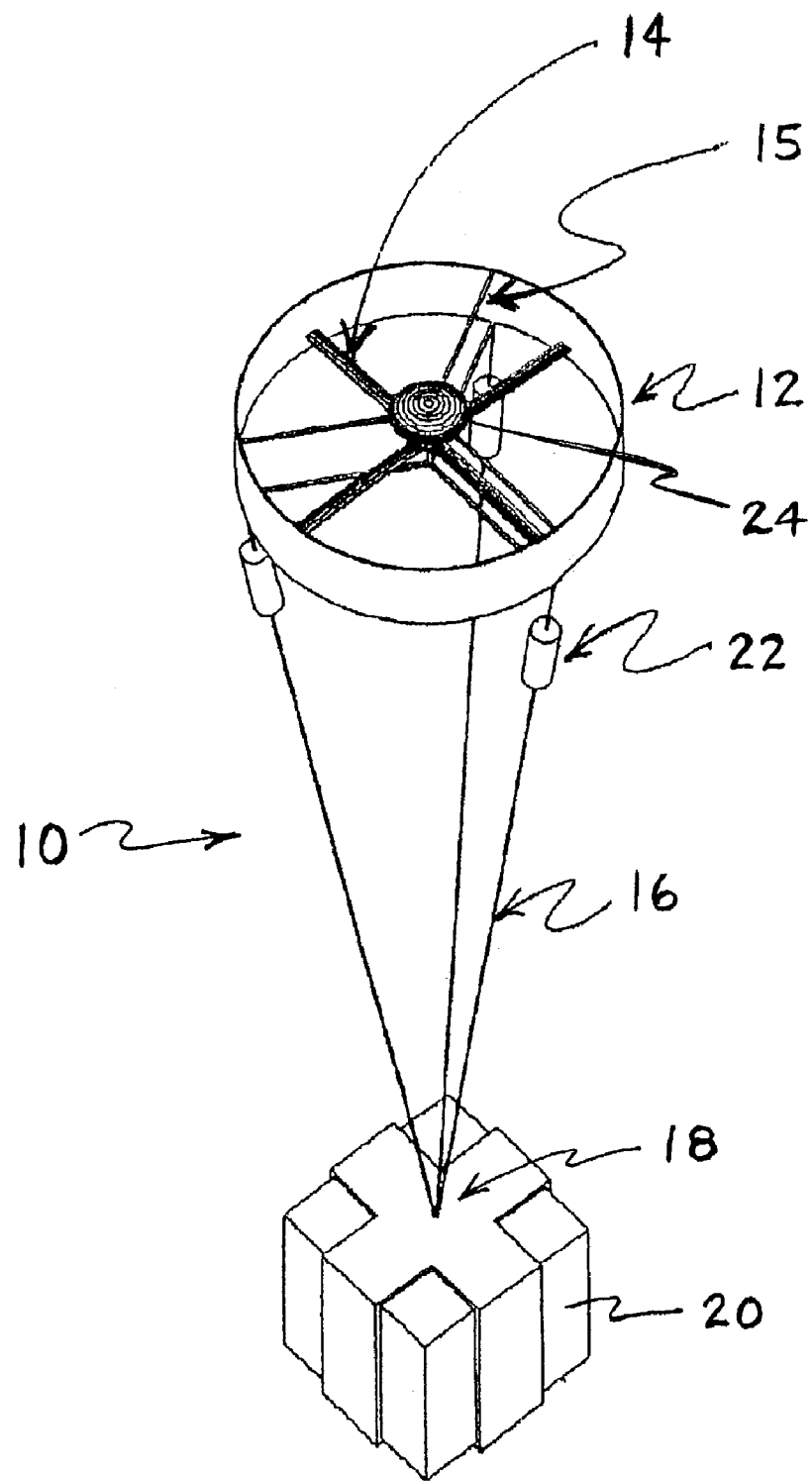
FIG. 1 is a perspective view of an air drop device, according to the present invention, attached to a load.

An air drop device 10 includes a frame 12 in the form of a short duct. Helicopter-like blades 14 are rotatably mounted to an axle (not shown) supported by a set of fin stabilizers 15 of frame 12. The pitch of the blades 14 is collectively controllable. Attached to the bottom of the frame are three tethers 16, which converge to a point 18: the attachment point for a parcel 20.

The free-drop device 10 is released into the air from a sufficiently high altitude, and the blades spin up due to autorotation. At a critical speed the pitch of the blades is increased and the rate of descent of the device slows: near the ground the rate is ideally slowed to zero for a soft landing.

Each tether 16 has a tether length adjust device 22 that allows for effective contraction or elongation of the tether 16: as these devices 22 are selectively contracted or elongated the orientation of the frame 12 with respect to the parcel changes: this allows the device to be directed to its destination.

Figure 2A:
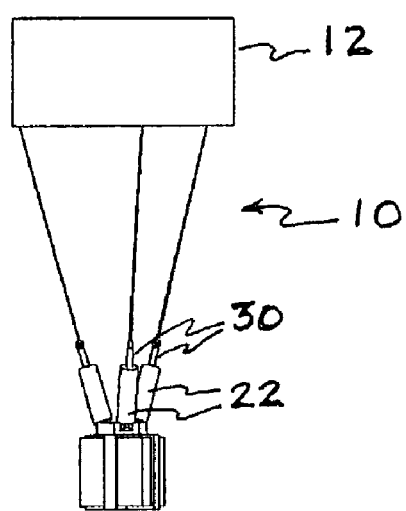
FIG. 2A is a side view of the air drop device of FIG. 1, in flight.
Figure 2B:
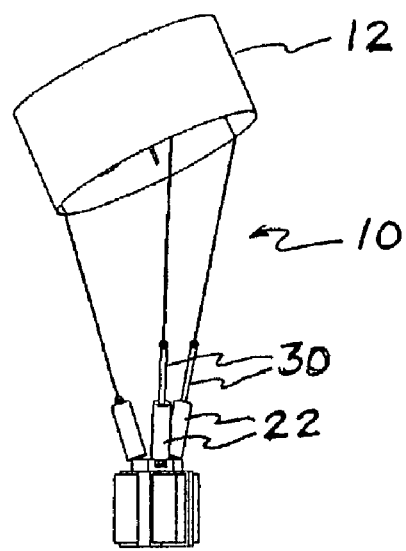
FIG. 2B is a side view of the air drop device of FIG. 1, in flight and being steered.
Figure 3:
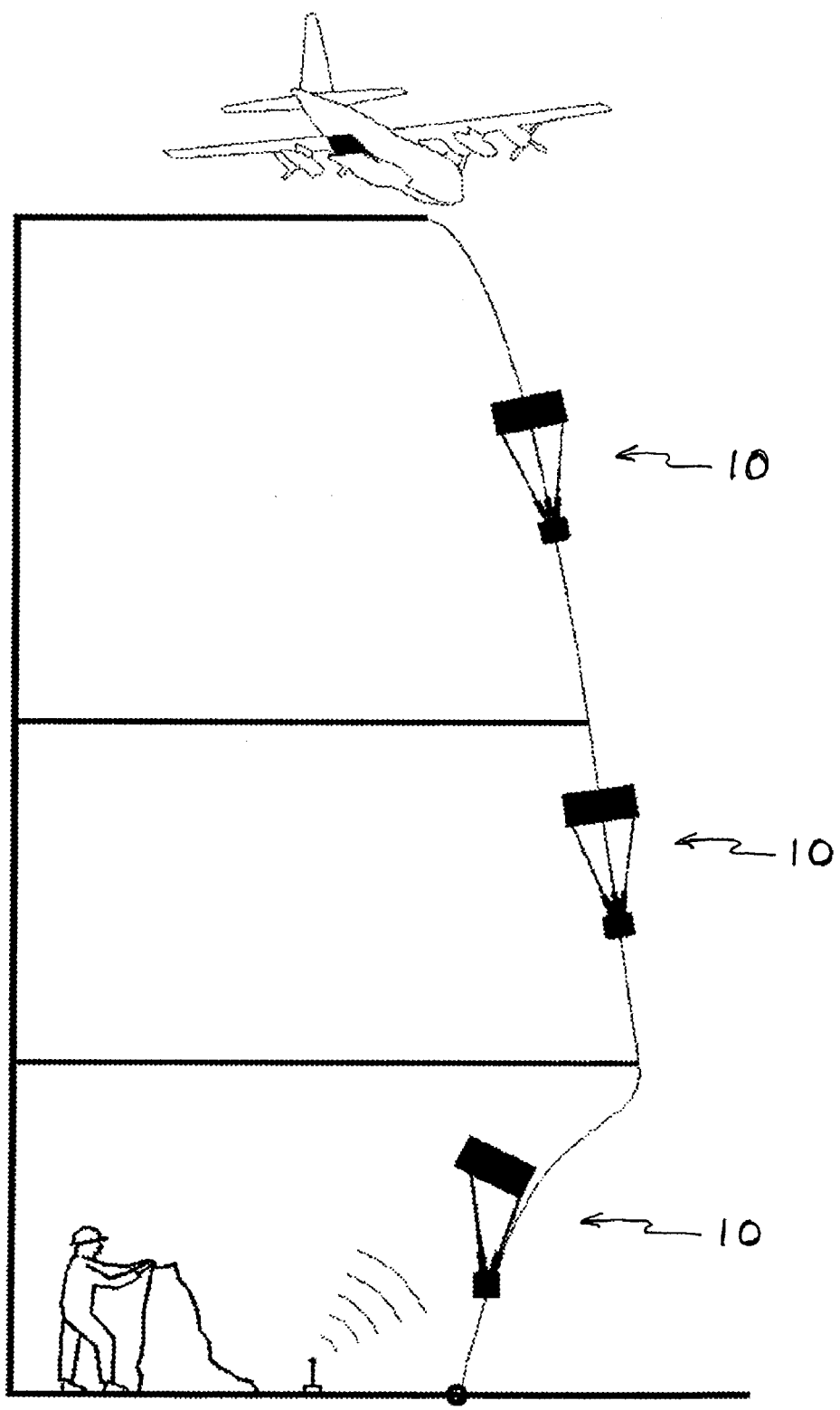
FIG. 3 is an illustration of an air drop using the device of FIG. 1.

In use the air drop device 10 would be equipped with a hub receiver 24 capable of controlling length adjust devices 22, to direct the device 10. This would allow a prospective recipient to use a device that would broadcast to hub receiver 24, in order to guide the device 10 to him. Referring to FIG. 3, this may be viewed as fixing the device location and orientation in 3-space: a signal sent from the potential recipient would serve to guide the device 10 to its XY destination on the ground by controlling the length adjust devices 22. Referring to FIGS. 2A and 2B, it can be seen that length adjust devices are more specifically piston cylinders having an outwardly extending retractable rod 30.

Device 10 is slowed by autorotation of blades 14. The pitch change is effected by one of two methods:

1) Remote control, activated by either the parcel recipient or a ground proximity sensor;
2) Automatically, as the centripetal force of the blades 14 increases to a critical point wherein a release would allow simultaneous pitch change for all blades 14. (This avoids the requirement that a powered mechanism be employed). Alternatively, blade 14 pitch varies continuously, as a function of blade 14 centripetal force.

Figure 4:
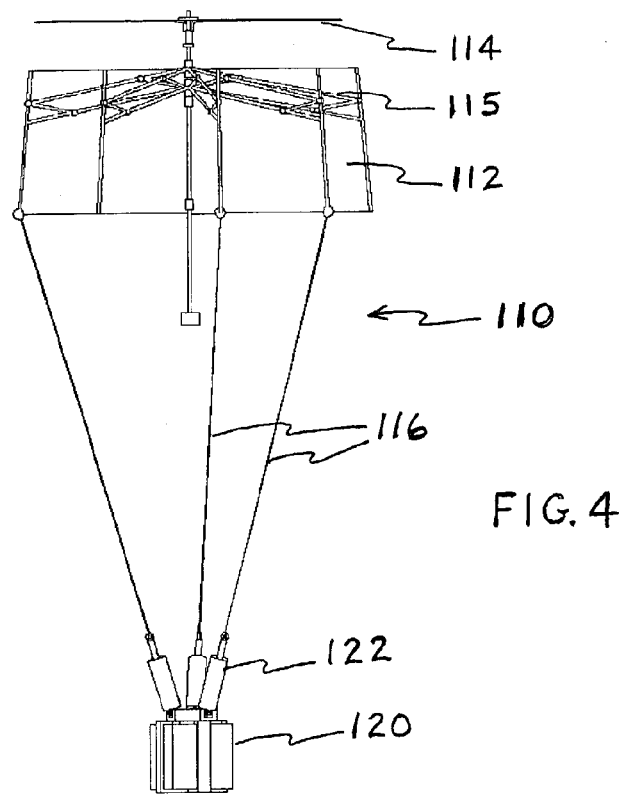
FIG. 4 is a side view of an alternative embodiment of an air drop device, according to the present invention.
Figure 5:
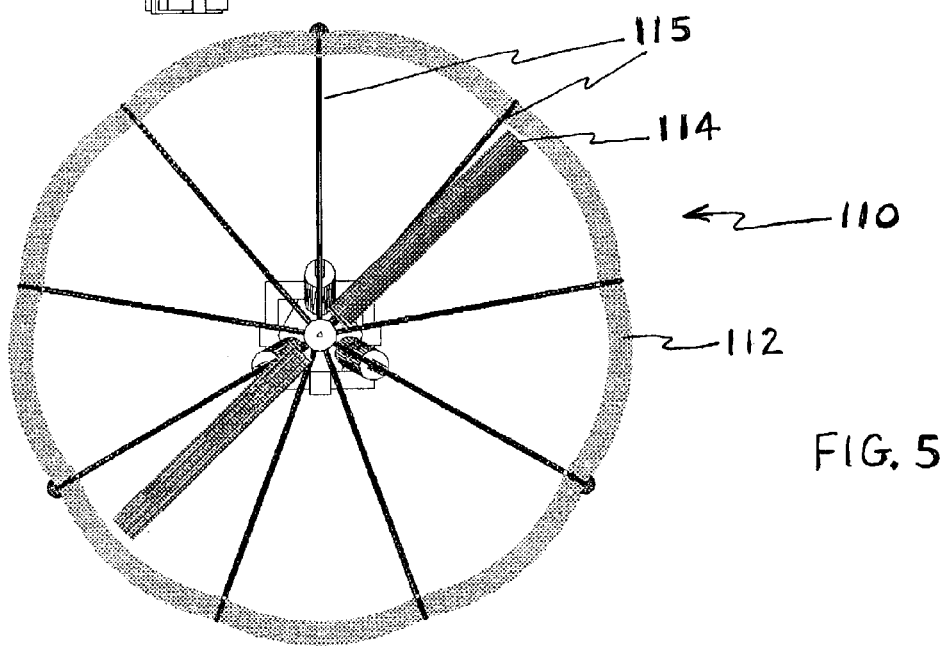
FIG. 5 is a top view of the air drop device of FIG. 4.
Figure 6:
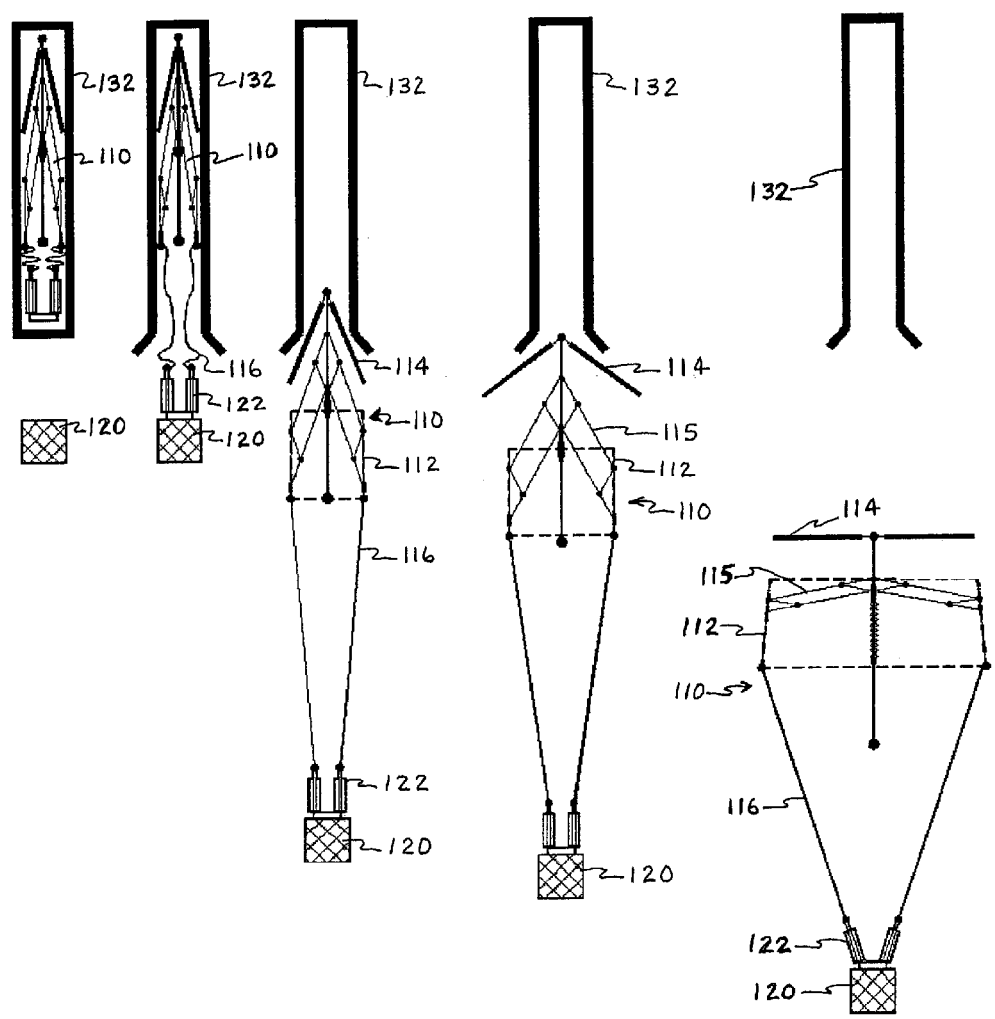
FIG. 6 is an illustration of the air drop device of FIG. 4 being released from a chute and assuming its operational form.

Referring to FIGS. 4, 5 and 6, an alternative preferred embodiment of an air drop device 110 is designed to be attached to a parcel 120 and becomes functional automatically when launched. This design is most appropriate for larger parcels.

The air drop device 110 expands to its flying form by virtue of a spring-assisted umbrella-like articulated set of struts 115 for the frame 112, and spring-loaded hinged Blades 114.

Referring to FIG. 6, the air drop device 110 is packed and withdrawn from a horizontally mounted associated holding structure 132, such as a rigid box or tube made of low-cost materials such as PVC pipe. Handling requires attachment of the device 110 to the parcel 120 and withdrawing the device 110 to the point where the spring loading would expand the frame 112 and unfold the blades 114.

The terms and expressions that have been employed in the foregoing specification are used as terms of description and not of limitation. There is no intention, in the use of such terms and expressions, of excluding equivalents of the features shown and described or portions thereof, it being recognized that the scope of the invention is defined and limited only by the claims which follow.

What is claimed is:

1. An air drop device, comprising:
   (a) a frame defining a through-hole and supporting a substantially vertical axle, substantially central to said through-hole;
   (b) a blade assembly, rotatably mounted to said substantially vertical axle;
   (c) at least three tethers connected to said frame and adapted to be connected to a parcel; and
   (d) a set of tether length adjust devices, each located on a different one of said tethers and being selectively and independently capable to take-up some of said tether to reduce the length of said tether, thereby steering said device.

2. The air drop device of claim 1, wherein each tether length adjust device is remotely controllable, so that a remote user could use said length adjust devices to steer said air drop device.

3. The air drop device of claim 1, wherein said blade assembly includes a set of blades and wherein each of said blades has a pitch that is adjustable.

4. The air drop device of claim 3, wherein said pitch of said blades is related to centripetal force of said blades.

* * * * *